United States Patent
Yermakov et al.

(10) Patent No.: US 10,491,754 B2
(45) Date of Patent: *Nov. 26, 2019

(54) VISUALIZING PREDICTED CUSTOMER BANDWIDTH UTILIZATION BASED ON UTILIZATION HISTORY

(71) Applicant: Level 3 Communications, LLC, Broomfield, CO (US)

(72) Inventors: Sergey Yermakov, Littleton, CO (US); Travis Duane Ewert, Highlands Ranch, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/217,706

(22) Filed: Jul. 22, 2016

(65) Prior Publication Data

US 2018/0027130 A1  Jan. 25, 2018

(51) Int. Cl.
| | |
|---|---|
| *H04M 11/00* | (2006.01) |
| *H04M 15/00* | (2006.01) |
| *H04L 12/26* | (2006.01) |
| *H04W 72/04* | (2009.01) |

(52) U.S. Cl.
CPC .......... *H04M 15/853* (2013.01); *H04L 43/16* (2013.01); *H04M 15/61* (2013.01); *H04W 72/0446* (2013.01)

(58) Field of Classification Search
CPC .................. H04W 4/24; H04W 4/26
USPC ................................. 455/405, 406
See application file for complete search history.

(56) References Cited

U.S. PATENT DOCUMENTS

| | | |
|---|---|---|
| 2002/0172222 A1 | 11/2002 | Ullmann et al. |
| 2008/0049641 A1 | 2/2008 | Edwards |
| 2008/0273591 A1 | 11/2008 | Brooks |
| 2009/0003201 A1 | 1/2009 | Horvitz |
| 2010/0218104 A1 | 8/2010 | Lewis |
| 2015/0289279 A1 | 10/2015 | Xu |
| 2015/0333992 A1 | 11/2015 | Vasseur |
| 2018/0123901 A1 | 5/2018 | Yermakov et al. |

OTHER PUBLICATIONS

International Search Report dated Oct. 6, 2017, Int'l Appl. No. PCT/US17/043341, Int'l Filing Date Jul. 21, 2017; 3 pgs.
Written Opinion of the International Searching Authority dated Oct. 6, 2017, Int'l Appl. No. PCT/US17/043341, Int'l Filing Date Jul. 21, 2017; 7 pgs.

*Primary Examiner* — Temica M Beamer (57) ABSTRACT

A method for providing a predicting bandwidth utilization for a customer of a connectivity service provider is disclosed. The method includes receiving bandwidth utilization data over time for a customer of a connectivity service provider. The method further includes training a machine learning model for the bandwidth utilization data during a time period based on the received data. In an embodiment, training the machine learning model includes determining a value for a parameter. The bandwidth utilization may be substantially periodic over the time period. Relying on the periodicity of the bandwidth utilization, the method further includes predicting, using the trained model, future bandwidth utilization over time.

20 Claims, 5 Drawing Sheets

VISUALIZING PREDICTED CUSTOMER BANDWIDTH UTILIZATION BASED ON UTILIZATION HISTORY

BACKGROUND

Field

This field is generally related to analyzing bandwidth utilization data of network customers.

Related Art

Bandwidth utilization data for a customer may be collected from the routers in a connectivity service provider environment. Typically, bandwidth utilization for a customer of a connectivity service provider follows periodical patterns. For example, end users of a commercial customer (e.g., a corporation) work mostly between 9 AM-5 PM during Monday-Friday. As such, for example, bandwidth utilization of the customer on a Monday is expected to be high between 9 AM-5 PM and low outside of this window. Furthermore, bandwidth utilization of the customer may have peaks between 10 AM-11 AM and 2 PM-3 PM every day, and dips around 12 PM-1 PM (lunch hour). Additionally, bandwidth utilization of a customer that performs data backups on Sundays is expected to exhibit weekly peaks during the backup times every Sunday.

Network services may, for example, provide connectivity from a customer network to another computer network, such as the Internet. A customer connects to a server using a connectivity service provided by a connectivity service provider. Customers are often interested in analyzing the traffic streaming to or from their customers. Such analysis may, for example, help the customers to determine potential issues within their network, or determine whether they have purchased sufficient network capacity from the connectivity service provider.

BRIEF SUMMARY

In an embodiment, a method is disclosed for providing a predicting bandwidth utilization for a customer of a connectivity service provider is disclosed. The method includes receiving bandwidth utilization data over time for a customer of a connectivity service provider. The method further includes training a machine learning model for the bandwidth utilization data during a time period based on the received data. In an embodiment, training the machine learning model includes determining a value for a parameter. The bandwidth utilization may be substantially periodic over the time period. Relying on the periodicity of the bandwidth utilization, the method further includes predicting, using the trained model, future bandwidth utilization over time. In an embodiment, the historical and predicated bandwidth utilization over time for a customer are visually displayed to the customer.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

In an embodiment, given the periodical nature of bandwidth utilization, historical bandwidth utilization data for a customer is collected and analyzed to learn the bandwidth utilization pattern of a customer during an interval of the periodicity (e.g., day, week, or month). To learn the bandwidth utilization pattern of a customer during a periodicity interval, a machine learning technique called regression may be used, and using this technique, the bandwidth utilization may be forecasted.

Regression is a statistical process for estimating a relationship between variables, including relationship between a dependent variable (e.g., bandwidth utilization) versus an independent variable (e.g., time). The relationship between variables will be related by one or more parameters. For example, in a linear regression model with one dependent variable and one independent variable, the statistical process results in the determination of two or more parameters, referred to as a "slope" and "intercept". In embodiments, the regression technique applied to a time series describing bandwidth utilization over time is based on both linear and non-linear kernel methods. Kernel methods are a class of algorithms used in machine learning (both regression and classification) that rely on kernel functions. In the exemplary embodiment, the radial basis function (RBF) kernel function is used. In other embodiments, several kernels can also be used to achieve the same goal (e.g. Gaussian, Polynomial, Spline, Laplacian, etc.). In an embodiment, the learned bandwidth utilization pattern during a periodicity interval may be used to predict bandwidth utilization of the customer during future periodicity intervals.

It is often helpful for a customer to visually study its historical and forecasted bandwidth utilization. For example, the customer may use this visual study to identify whether it has purchased the right amount of network capacity from the connectivity service provider. Additionally, the customer may compare previously predicted bandwidth utilization data for a time interval with the real bandwidth utilization data later received for the same time interval and identify potential discrepancies. The discrepancies may, for example, indicate faulty network components such as gateways or cables, or divulge malicious network activities such as network or security attacks. In an example, one or more end user machines of a customer may be compromised and unwillingly participate in malicious network activities 24 hours a day. In this example, daily bandwidth utilization pattern of the customer may show significant difference with the previously predicted bandwidth utilization data based on historical daily bandwidth utilization. Studying such discrepancies may help the customer identify this problem.

Figure 1:
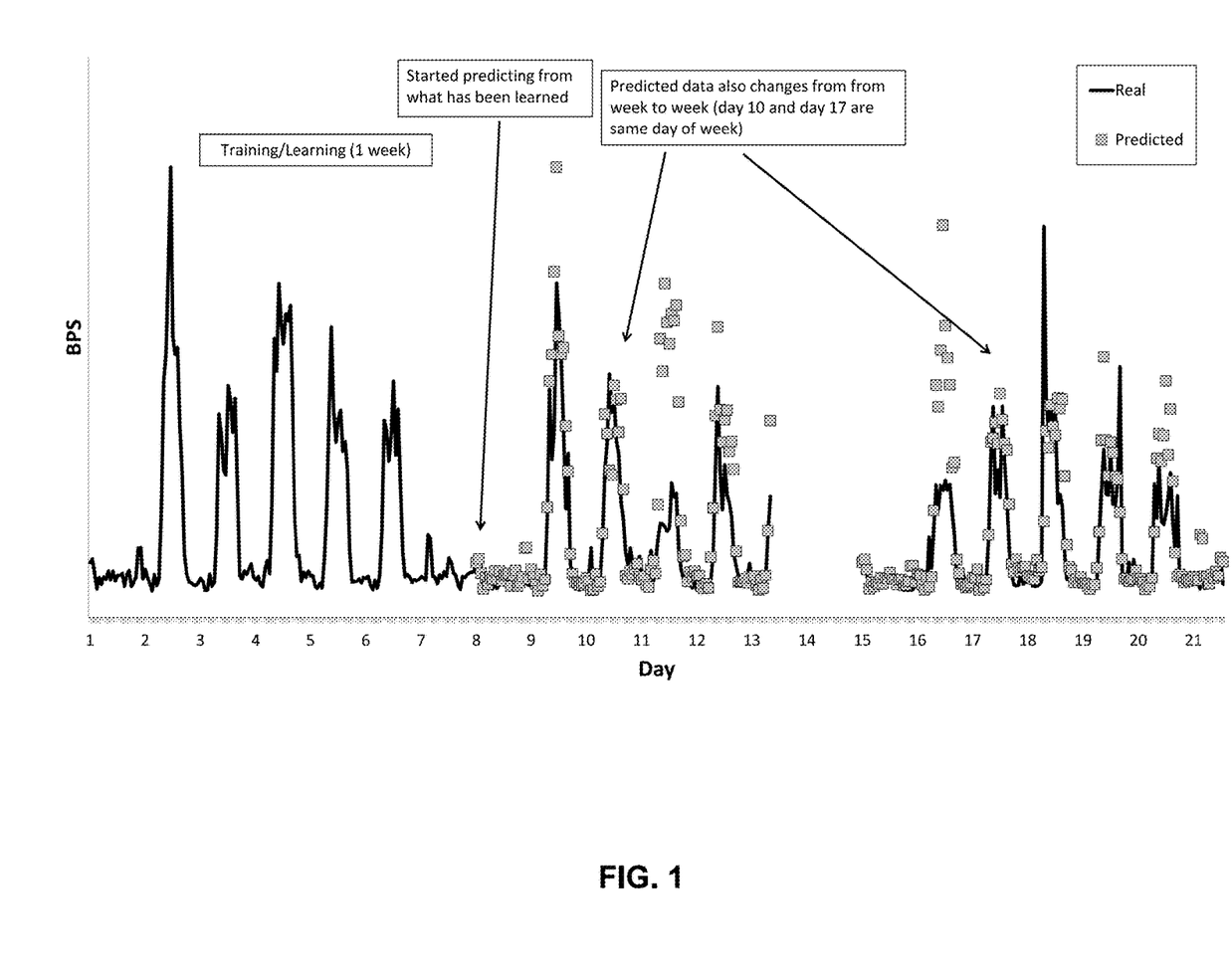
FIG. 1 is an example graph depicting bandwidth utilization over time for a customer of a connectivity service provider, according to an embodiment.

FIG. 1 is an example graph depicting bandwidth utilization over time for a customer of a connectivity service provider, according to an embodiment.

Specifically, in FIG. 1, an example bandwidth utilization over time for a customer during 20 consecutive days (starting from day 1 which is a Sunday) is illustrated. In FIG. 1, the solid graph corresponds to observed bandwidth utilization whereas the dashed graph corresponds to predicted bandwidth utilization. The method used to perform the prediction will be shortly described with respect to FIG. 3. Studying the bandwidth utilization on the first 7 days on the observed graph depicted in FIG. 1 illustrates that bandwidth utilization on Saturday (day 7) and Sunday (day 1) is lower than the rest of the week. Additionally, it can be seen that bandwidth utilization follows similar patterns for week days, e.g., Monday-Friday. Additionally, often times, bandwidth utilization pattern, such as the pattern shown in this example graph, is approximately periodic for the weeks that follow unless a drastic change in data utilization usage of the customer occurs. For example, in the weeks that follow, bandwidth utilization pattern during coming Mondays will be closely similar to the bandwidth utilization pattern observed during the Monday for which the bandwidth utilization pattern is shown in FIG. 1. That is, bandwidth utilization pattern over different weeks is periodic. Similarly, such periodicity may also be observed on a monthly basis. That is, in the absence of any substantial change in network usage or architecture, bandwidth utilization pattern over a month is substantially similar to the bandwidth utilization pattern observed in the previous months.

In an embodiment, the periodic nature of bandwidth utilization is used to predict future bandwidth utilization of customers of a connectivity service provider. For example, once a model (pattern) is learned for bandwidth utilization over time for a week, this model may be used to predict bandwidth utilization over time for the week that follows.

In FIGS. 2-5, methods and systems are described for learning bandwidth utilization pattern of customers during time intervals of bandwidth utilization periodicity (e.g., day, week, or month), according to embodiments. Additionally, methods and systems are described to use the periodically repeated bandwidth utilization patterns to forecast bandwidth utilization of customers in the future.

Figure 2:
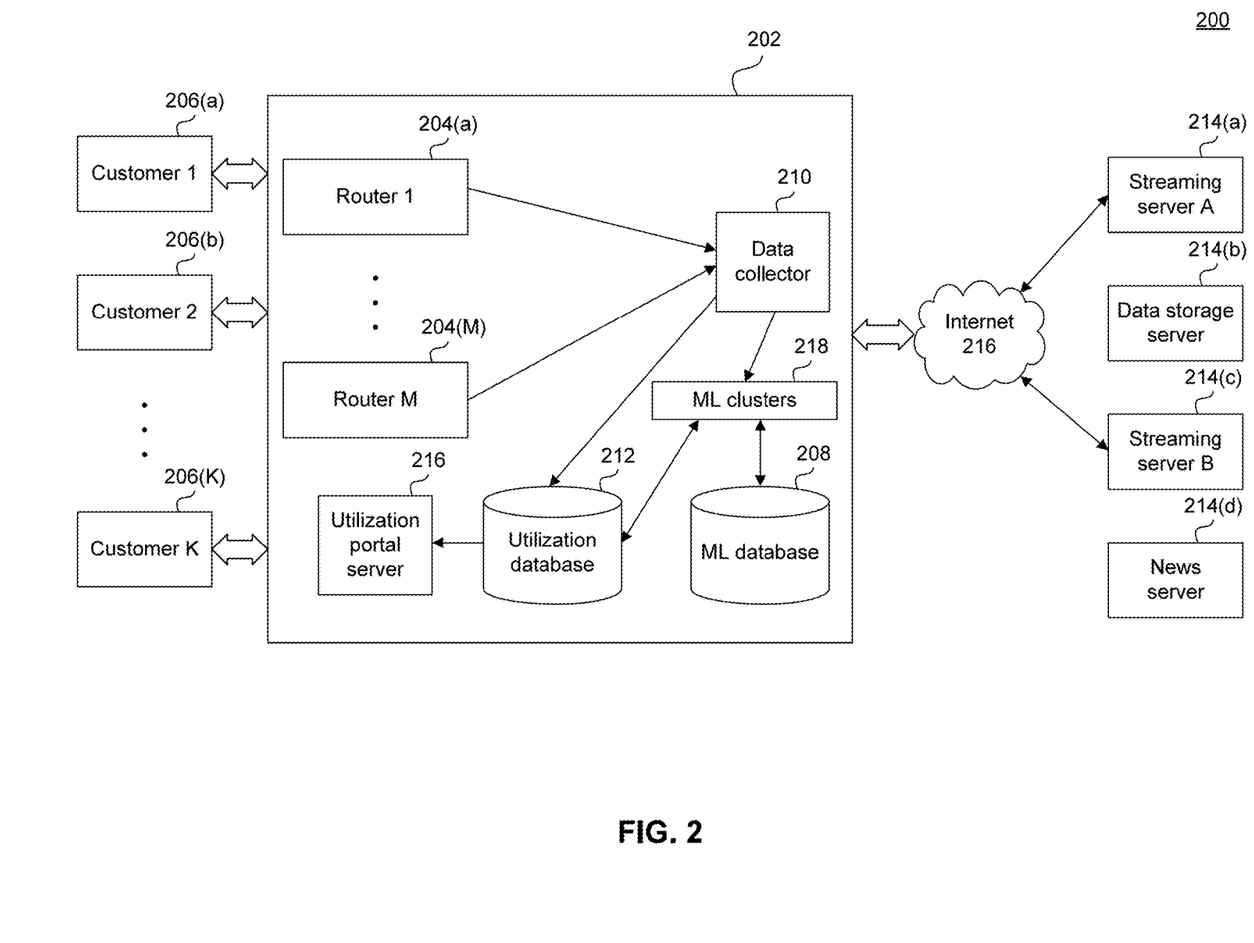
FIG. 2 is a diagram of a connectivity service provider including routers and components for collecting and analyzing bandwidth utilization data for customers, according to an embodiment.

FIG. 2 is a diagram of a data transmission environment 200 that includes a connectivity service provider 202. Connectivity service provider 202 includes a plurality of routers 204(a) to 204(M) that provide network connectivity to the Internet 216 for the plurality of customers 206(a) to 206(K).

Customers 206(a) to 206(K) may be end users in a residential environment, and accessing the Internet through their devices such as personal computer (PC), laptop, tablet, smart phone, etc. Alternatively, customers may be commercial such as a business. For example, a business may require connectivity to a content provider or a data storage server to back-up all the files within its system.

Customers 206(a) to 206(K) may use connectivity service provider 202 to receive data from a variety of content providers, such as streaming servers 214(a) and 214(c), data storage server 214(b), news server 214(d), and/or other servers such as a cloud server. Customers 206(a) to 206(K) may use connectivity service provider 202 to also send (upload) data to a variety of servers.

Customers 206(a) to 206(K) may, for example, reside in a local area network (LAN) confined to a particular area, such as a building. In another example, customers 206(a) to 206(K) may be in a company intranet connecting different computers in the same organization. The various computers may have web browsers or other applications that require access to resources via a network, such as a private network or the Internet. Connectivity service provider environment 202 may use TCP/IP routing protocols, and customers 206(a) to 206(K) may use publicly or privately addressable IP addresses.

To determine how to route data, the various routers 204(a) to 204(M) on connectivity service provider environment 202 can exchange messages advertising their connectivity. The messages may for example be BGP messages. In that example, the routers that exchange messages may be BGP peers. Using these messages, the various routers can develop routing tables that define how to route data through the network.

Not only do various routers 204(a) to 204(M) on connectivity service provider environment 202 exchange messages, these routers also exchange messages with at least one router on Internet 216. The routers on the Internet 216 may comprise backbone routers, etc. that provide communication between customers 206(a) to 206(K) of connectivity service provider environment 202 and various servers 214(a) to 214(d) using cable, fiber optics, and/or wireless communication.

Each router 204(a) to 204(M) has access to a data collector 210. In an embodiment, data collector 210 periodically (e.g., once every 1 minutes or 5 minutes) collect statistics on the rate of traffic being relayed through each of these routers for each customer of the connectivity service provider, and therefore bandwidth utilization over time of the customer on different links between routers 204(a) to 204(M). As bandwidth utilization over time is obtained only periodically, it is in form of a (discrete) time series.

The statistics collected by data collector 210 may include bandwidth utilization over time for a specific customer and/or related to different types of traffic, e.g., ingress traffic, egress traffic, or traffic corresponding to different Class of Service (CoS) data streams. Additionally or alternatively, data collector 210 may sniff traffic being relayed through routers 204(a) to 204(M), i.e., receive a copy of all or periodically sampled packets being relayed through routers 204(a) to 204(M). Data collector 210 may use the sniffed traffic to generate statistics on traffic rates and bandwidth utilization over time for different customers as described above.

In an embodiment, data collector 210 may be a daemon operating on each router 204(a) to 204(M) that periodically collects packets. Alternatively, data collector 210 may be one or more servers separate from routers 204(a) to 204(M).

Connectivity service provider 202 may also include a utilization database 212 that stores and maintains bandwidth utilization over time for different customers as collected or generated by data collector 210. Utilization database 212 may also store and maintain predicted bandwidth utilization over time for different customers.

Connectivity service provider 202 may also include a machine learning cluster (ML cluster) of servers 218. ML cluster 218 receives statistics on bandwidth utilization over time. In "batch" learning mode, it receives the statistics from utilization database 212, while in "online" learning mode, it receives the data from the data collector 210. The ML cluster then analyzes the received bandwidth utilization data in either batch or online mode, as will be described in greater detail with respect to FIG. 3.

Connectivity service provider 202 may also include a machine learning state database (ML database) 208. ML database 208 may store and maintain information for a bandwidth utilization model trained to describe bandwidth utilization data over time for customers (e.g., customers 106(a)-106(K)) of connectivity service provider 202. ML database 208 may be accessed by or updated by ML cluster 218. For example, ML cluster 218 may retrieve a current bandwidth utilization model for a customer from ML database 208 and update the model to incorporate data recently received by data collector 210. More details about updating the bandwidth utilization model for customers of connectivity service provider 202 will be described shortly with respect to FIG. 3.

Connectivity service provider 202 may also include a utilization portal 216. Utilization portal 216 may be a server that maintains individual accounts for different customers of connectivity service provider 202. Utilization portal 216 may include a graphical user interface that, upon request, provides a graphical display of each customer's historical, current, or predicted bandwidth utilization over time such as the graphical display shown in FIG. 1. In an embodiment, utilization portal 216 may provide an animated graphical display for observed or predicted bandwidth utilization that scrolls over time axis as new bandwidth utilization data versus time is received.

Figure 3:
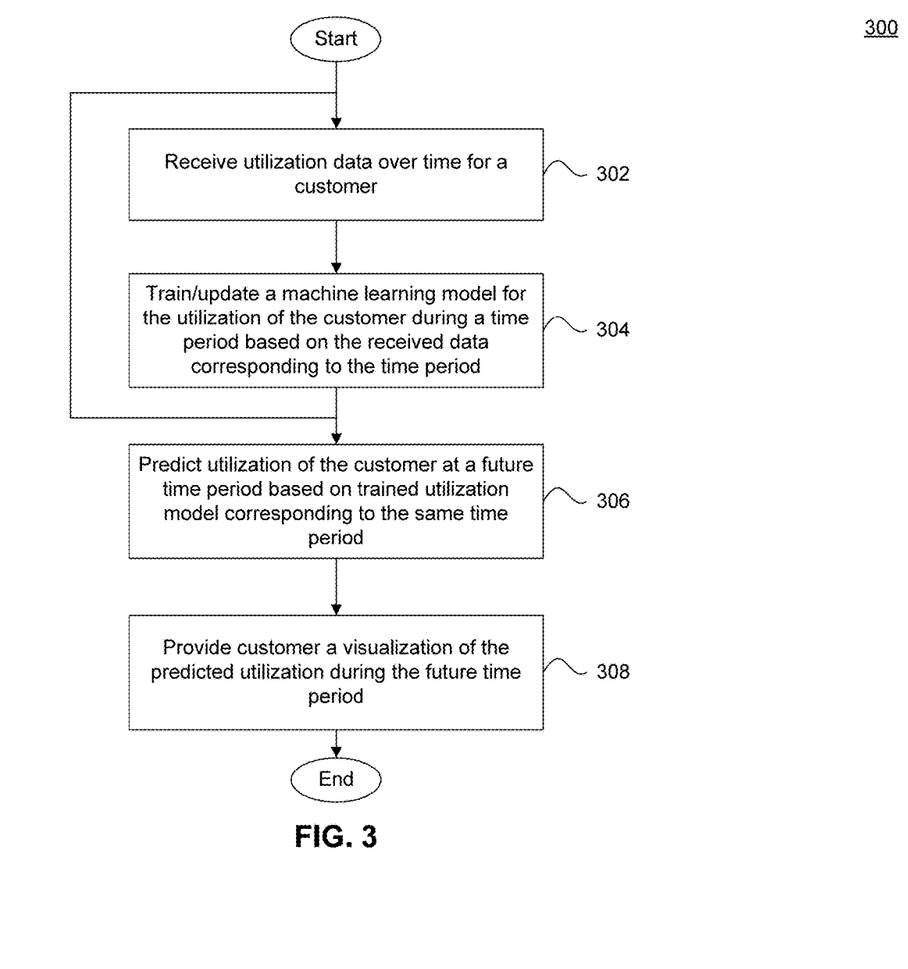
FIG. 3 is a flowchart for a method of analyzing bandwidth utilization data for a customer of a connectivity service provider and predicting future bandwidth utilization pattern of the customer, according to an embodiment.

FIG. 3 is a flowchart for a method 300 of analyzing bandwidth utilization data for a connectivity service provider's customer to predict future bandwidth utilization of the customer, according to an example embodiment, and is defined with respect to the example embodiment in FIG. 2.

At step 302, bandwidth utilization data over time, representing a customer's utilization being relayed through routers, such as router 204(a)-204(M) in a connectivity service provider 202, is received. The bandwidth utilization data may be, for example, received by data collector 210.

In an embodiment, at step 302, bandwidth utilization over time is received only for a small duration of time within a time period. The time period may be a time period of periodicity of bandwidth utilization, e.g., daily, weekly, or monthly. The periodicity of bandwidth utilization over time may be previously observed by studying the historical bandwidth utilization over time for the customer. For example, by studying the historical bandwidth utilization of the customer for 8 weeks, it may be observed that bandwidth utilization over different weeks highly resemble each other, i.e., bandwidth utilization of the customer is periodical over weeks.

In an example, while the time period of periodicity is a week, bandwidth utilization data is received and the method proceeds to step 304 as this data becomes available (observed), e.g., for the last 5 minutes. In other words, instead of receiving utilization data in a "batch" (e.g., for one whole week), the utilization data is received dynamically in an "online" fashion. Alternatively, at step 302 bandwidth utilization data may be received in batches, i.e., fully received for one or more durations of the time period before proceeding to step 304.

At step 304, a model for bandwidth utilization of the customer during the time period is trained using bandwidth utilization data received in step 302. The training may be based further on bandwidth utilization data obtained from the previous time periods.

The training process may be a machine learning process such as regression. During the regression process, it is attempted to find or update a relationship between bandwidth utilization (assumed to be a dependent variable) and time (an independent variable). The regression process may be a linear regression. In this case, a general model such as a linear or a polynomial relationship between bandwidth utilization and time is considered. The model is then trained based on the time series that describes bandwidth utilization over time during the time period. During the training, a value for one or more parameters is determined that describes bandwidth utilization as a linear combination of the one or more parameters (but not necessarily linear in the independent variables).

Alternatively, the regression process may be a non-linear regression such as kernel-based regression. In embodiments, kernel-based regression is used where, the model defining the relationship between bandwidth utilization and time is a sum of a plurality of kernel functions each evaluated at a data point and weighed by a parameter that is to be determined based on the given utilization data over time. Several kernel functions exist that can be utilized in this regression, for example a polynomial of various degrees, a sigmoid function, an RBF, etc.

In embodiments, at the end of the training process, a value for one or more parameters is determined (or updated) based on the bandwidth utilization data over time for the time period. Training performed using batch data is sometimes referred to as batch training, while training performed using online data is referred to as online training.

In an embodiment, a model describing weekly bandwidth utilization over time is determined based on bandwidth utilization over time received over the first N weeks. On the $(N+1)^{th}$ week, as more bandwidth utilization data over time becomes available corresponding to Monday, the weekly model is updated to incorporate the new utilization data. As the newly received bandwidth utilization data corresponds to Monday, it does not affect the model in the time instances outside Monday, e.g., Tuesday etc. This may make the model robust and resilient to data loss that may be experienced for a duration of time. For example, if bandwidth utilization data for the previous Friday is lost, this loss does not affect the accuracy of the obtained bandwidth utilization model in the time instances that do not correspond to Friday (e.g., Monday).

Additionally, method 300 may be resilient to loss of data for a duration of time as utilization data is constantly received and the utilization data model is constantly updated using the new data. For example, if from the beginning of method 300, bandwidth utilization over time for 12 weeks have been received and the model was trained based on these 12 weeks, loss of data for a few days during the $13^{th}$ week will not drastically impact the model. Therefore, this method of obtaining a model that describes bandwidth utilization over time is superior to methods such as moving average (MA) that may be drastically skewed in presence of data loss.

At step 306, bandwidth utilization of the customer is predicted at time stances during a future time period based on the trained bandwidth utilization model obtained at step 304. As described previously, this prediction is based on previous observations that bandwidth utilization during the previous time periods closely resembles each other, i.e., bandwidth utilization is periodic over the time period, as was described with respect to FIG. 1.

Optionally, at step 308, a visualization of the predicted bandwidth utilization over time is provided to the customer. The visualization may include historically observed bandwidth utilization over time, and predicted bandwidth utilization for all or a fraction of a time period of periodicity of the bandwidth utilization. For example, the visualization may display bandwidth utilization during the past 4 weeks, and the predicted bandwidth utilization for the next day (or week).

In an embodiment, the visualization may be provided using a portal provided by a utilization portal server 216 that is a component of a connectivity service provider (e.g., connectivity service provider 202) and made available to the customer. For example, the customer may login to the portal using an account previously set up for the customer. The portal server 216 may access utilization database 212 to obtain historical and predicted bandwidth utilization over time for the subscribed customer that has logged in and requested the visualization.

Figure 4:
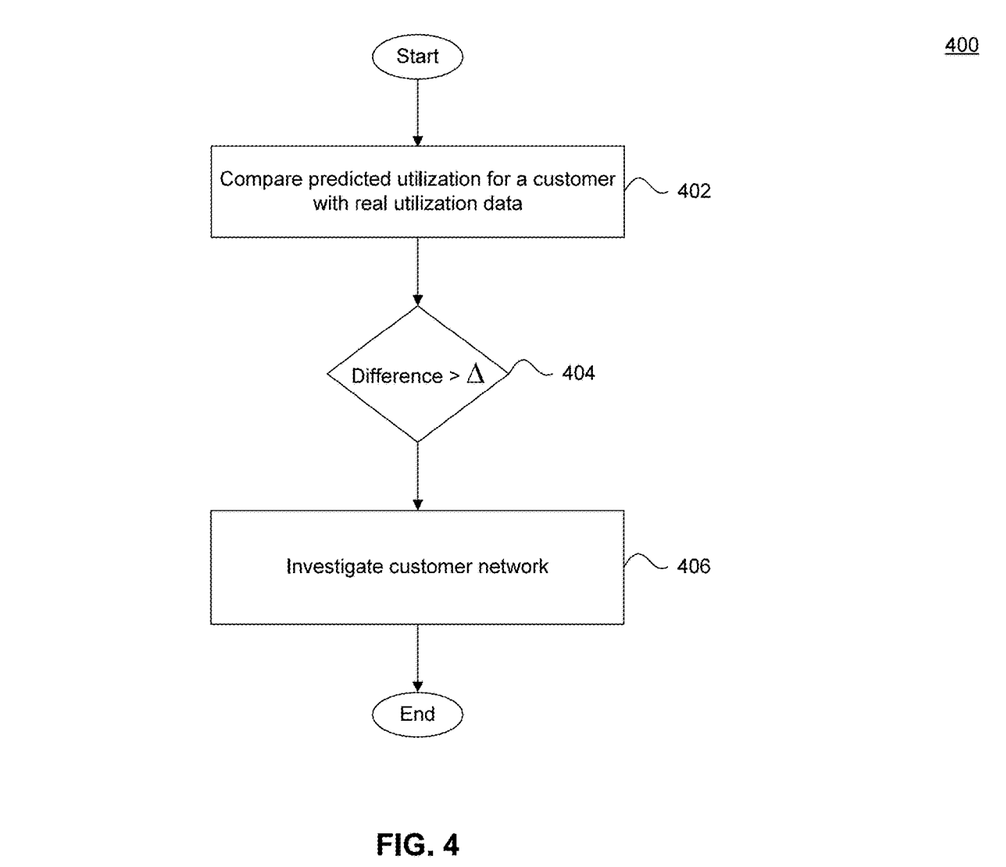
FIG. 4 is a flowchart for a method for determining whether a customer network or connectivity service needs monitoring or trouble shooting, according to an embodiment.

FIG. 4 is a flowchart for a method 400 for determining whether a customer network needs monitoring or trouble shooting its connectivity service, according to an embodiment.

At step 402, previously predicted bandwidth utilization over time for a customer during a time interval is compared with the observed bandwidth utilization over time for the same time interval. The difference between the previously predicted bandwidth utilization over time and observed bandwidth utilization over time for the time interval may be quantified using a metric such as summation of absolute value or summation of square of the difference between the two over all discrete time instances during the time interval. Alternatively, other metrics may be used in quantifying the difference between the previously predicted bandwidth utilization over time and observed bandwidth utilization over time for the time interval.

At step 404, a quantity representing the difference between the previously predicted bandwidth utilization over time for the customer and the observed bandwidth utilization over time for the same interval, as obtained in step 402, is compared to a predetermined value $\{\Delta\}$. The value of $\Delta$ may be an absolute value. Alternatively, the value of $\Delta$ may be a relative value, e.g., the difference may be normalized with respect to the value of the allocated capacity of the connectivity service provided to the customer. Alternatively, the value of $\Delta$ may be normalized with respect to the average observed bandwidth utilization over time during the time interval. As a person of ordinary skill in the art appreciates, other methods of calculating $\Delta$ may be used without departing from the scope of the disclosure.

If the difference between the previously predicted bandwidth utilization over time for the customer and the observed bandwidth utilization over time for the same interval is greater than $\Delta$, one or more actions may be taken by the customer or a connectivity service provider (e.g., connectivity service provider 202) serving the customer. For example, the connectivity service provider may notify the customer, e.g. by flagging the customer account and reflecting this flag in the customer's portal page. Additionally or alternatively, the connectivity service provider may police the data relayed for the customer to determine whether a network security attack is taking place. Furthermore, the connectivity service provider may examine the route between the customer and internet (e.g. internet 216) to determine whether a link failure has caused higher end-to-end delay and/or packet loss resulting in lowered bandwidth utilization. Additionally or alternatively, the customer may monitor the network usage of its end users to detect potential suspicious activity or network abuse.

Figure 5:
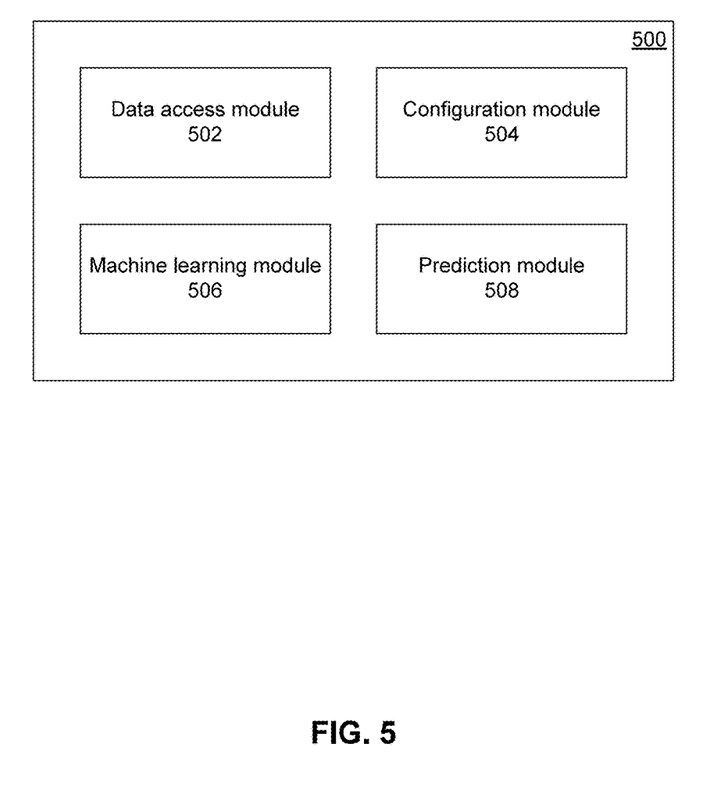
FIG. 5 is a diagram depicting modules within a server of a machine learning cluster within a connectivity service provider shown in FIG. 1 in further detail, according to an embodiment.

FIG. 5 is a diagram depicting modules within a machine learning server of a machine learning cluster (such as machine learning cluster 218) within a connectivity service provider (such as connectivity service provider 202) shown in FIG. 1 in further detail, according to an embodiment.

Data access module 502 retrieves historical bandwidth utilization data over time from the utilization database for a time period of periodicity of bandwidth utilization for a customer (such as customer 206(*a*) . . . 206(K)) from a utilization database, such as utilization database 212. The module can also receive the latest utilization data to update the model in concordance with online training. The utilization database stores and maintains historical bandwidth utilization data over time for one or more customers of the connectivity service provider. Additionally, the utilization database may store predicted utilization data for one or more customers when provided by the machine learning cluster.

Machine learning module 506 receives the retrieved data from data access module 502. Additionally, machine learning module 506 may retrieve a current bandwidth utilization model during the time period for the customer from a machine leaning database such as machine learning database 508. Machine learning module 506 may process this data, and train an updated model for bandwidth utilization over time as was described with respect to steps 302-304 of method 300 in FIG. 3.

Machine learning module 506 may store the obtained model for bandwidth utilization over time during a time period for the customer on the machine learning database.

Prediction module 508 uses the current model for bandwidth utilization over time during the time period for the customer and based on relying on the periodicity of the bandwidth utilization pattern over the time period, predicts bandwidth utilization for time instances in the future, as was described with respect to step 306 of method 300 in FIG. 3.

Configuration module 504 receives configuration selections made by a user of the connectivity service provider (such as an administrator). These selections may include a general model for training bandwidth utilization (e.g., linear regression, non-linear regression, or a specific type of kernel and the kernel's parameters). The selection may, for example, determine batch training or online training to be used. The configuration selection may, for example, determine how far in the future bandwidth utilization prediction is to be performed. The configuration selection may additionally or alternatively determine how bandwidth utilization visualization is to be presented to the customers. Other configuration selections related to how to perform training, predicting and/or presenting bandwidth utilization over time for different customers may additionally or alternatively be made at configuration module 504.

One or more processors may be used to implement, coordinate, and/or configure the component modules within a machine learning server and/or components within a connectivity service provider. The modules or components may be implemented using hardware, software or a combination thereof.

The term "user," as used herein, may encompass both a customer of the network connectivity service, such as an employee of a business that utilizes the network connectivity service, and a network administrator of the service provider itself. Users may also be at different companies or organizations.

Each of the devices and modules in FIGS. 1 and 5 may be implemented in hardware, software, firmware, or any combination thereof.

Each of the devices and modules in FIGS. 1 and 5 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for providing a predicting bandwidth utilization for a customer of a connectivity service provider, the method comprising:
receiving bandwidth utilization data over time for the customer;
training a machine learning model for the bandwidth utilization data during a time period based on the received data, wherein the training the machine learning model comprises determining values for a set of parameters, and wherein the bandwidth utilization is substantially periodic over the time period thereby generating periodically repeated bandwidth utilization patterns observable by the machine learning model; and
predicting, using the trained model, future bandwidth utilization over time, wherein the predicting is based on the periodically repeated bandwidth utilization patterns.

2. The method of claim 1, further comprising:
providing a visualization of the predicted bandwidth utilization over time to the customer.

3. The method of claim 1, wherein the time period is a day, a week, or a month.

4. The method of claim 1, wherein the model is a kernel-based model.

5. The method of claim 1, wherein the bandwidth utilization data corresponds to a class of service (CoS).

6. The method of claim 1, wherein the bandwidth utilization data corresponds to one of ingress data or egress data.

7. The method of claim 1, further comprising:
comparing a previously predicted bandwidth utilization over time for the customer during the time period with a received bandwidth utilization data for the same time period and determining a difference between the two; and
determining whether the difference exceeds a pre-determined threshold value, and
sending, when the difference exceeds the pre-determined threshold value, a notification to the customer.

8. The method of claim 1, wherein the utilization data corresponds to a portion of the time cycle.

9. The method of claim 1, wherein the received utilization data corresponds to a duration of a previous time period.

10. A system for providing a predicting bandwidth utilization for a customer of a connectivity service provider, the system comprising:
a utilization database;
a data collector configured to receive bandwidth utilization data from a router within the connectivity service provider and store the received bandwidth utilization data on the utilization database; and
a machine learning server comprising:
a data access module configured to retrieve bandwidth utilization data from the utilization database and the data collector,
a machine learning module configured to train a machine learning model for the bandwidth utilization data during a time period based on the received data, wherein the training the machine learning model comprises determining a value for a parameter, and wherein the bandwidth utilization is substantially periodic over the time period thereby generating periodically repeated bandwidth utilization patterns observable by the machine learning model, and
a prediction module configured to predict, using the trained model, future bandwidth utilization over time, wherein the predicting is based on the periodically repeated bandwidth utilization patterns observable by the machine learning model.

11. The system of claim 10, wherein the time period is a day, a week, or a month.

12. The system of claim 10, wherein the model is a kernel-based model.

13. The system of claim 10, wherein the bandwidth utilization data corresponds to a class of service (CoS).

14. The system of claim 10, wherein the bandwidth utilization data corresponds to one of ingress data or egress data.

15. A program storage device tangibly embodying a program of instructions executable by at least one machine to perform a method for providing a predicting bandwidth utilization for a customer of a connectivity service provider, the method comprising:
- receiving bandwidth utilization data representing a customer's bandwidth utilization;
- training a machine learning model for the bandwidth utilization data during a time period based on the received data, wherein the training the machine learning model comprises determining a value for a parameter, and wherein the bandwidth utilization is substantially periodic over the time period thereby generating periodically repeated bandwidth utilization patterns observable by the machine learning model; and
- predicting, using the trained model, future bandwidth utilization over time, wherein the predicting is based on the periodically repeated bandwidth utilization patterns.

16. The program storage device of claim 15, the method further comprising:
- providing a visualization of the predicted bandwidth utilization over time to the customer.

17. The program storage device of claim 15, the method further comprising:
- comparing a previously predicted bandwidth utilization over time for the customer during the time period with the received bandwidth utilization data for the same time period; and
- in response to determining that a difference between the predicted bandwidth utilization and the received bandwidth utilization data is greater than a predetermined threshold value, sending a notification to the customer.

18. The program storage device of claim 15, wherein the model is a kernel-based model.

19. The program storage device of claim 15, wherein the bandwidth utilization data corresponds to a class of service (CoS).

20. The program storage device of claim 15, wherein the bandwidth utilization data corresponds to one of ingress data or egress data.

* * * * *